US011676410B1

(12) United States Patent
Sandu et al.

(10) Patent No.: US 11,676,410 B1
(45) Date of Patent: Jun. 13, 2023

(54) LATENT SPACE ENCODING OF TEXT FOR NAMED ENTITY RECOGNITION

(71) Applicant: Amazon Technologies, Inc., Seattle, WA (US)

(72) Inventors: Ionut Catalin Sandu, Bucharest (RO); Alin-Ionut Popa, Bucharest (RO); Daniel Voinea, Ilfov (RO)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/449,070

(22) Filed: Sep. 27, 2021

(51) Int. Cl.
| G06K 9/00 | (2022.01) |
| G06V 10/40 | (2022.01) |
| G06V 30/414 | (2022.01) |
| G06F 18/2113 | (2023.01) |
| G06F 18/2415 | (2023.01) |
| G06F 40/295 | (2020.01) |
| G06V 30/10 | (2022.01) |

(52) U.S. Cl.
CPC .......... *G06V 10/40* (2022.01); *G06F 18/2113* (2023.01); *G06F 18/2415* (2023.01); *G06V 30/414* (2022.01); *G06F 40/295* (2020.01); *G06V 30/10* (2022.01)

(58) Field of Classification Search
CPC ...... G06V 10/40; G06V 30/414; G06V 30/10; G06F 18/2113; G06F 18/2415
See application file for complete search history.

(56) References Cited

U.S. PATENT DOCUMENTS

| 11,138,901 | B1* | 10/2021 | Angel | G06T 7/62 |
| 11,321,956 | B1* | 5/2022 | Geng | G06V 30/416 |
| 11,398,226 | B1* | 7/2022 | Wang | G06F 40/30 |
| 2019/0290172 | A1* | 9/2019 | Hadad | G06N 20/00 |
| 2021/0192201 | A1* | 6/2021 | Nguyen | G06V 20/62 |
| 2021/0240975 | A1* | 8/2021 | Sundell | G06F 18/24 |
| 2021/0256052 | A1* | 8/2021 | Luo | G06N 3/08 |
| 2021/0295101 | A1* | 9/2021 | Tang | G06F 18/2148 |
| 2021/0365687 | A1* | 11/2021 | Starson | G16H 20/60 |
| 2021/0375427 | A1* | 12/2021 | Neumann | G16H 50/20 |
| 2022/0044298 | A1* | 2/2022 | Oshinaike | G06N 20/00 |

(Continued)

OTHER PUBLICATIONS

Learning Deep Structure-Preserving Image-Text Embeddings, Liwei Wang et al, arXiv, Apr. 14, 2016, pp. 1-9 (Year: 2016).*

(Continued)

*Primary Examiner* — Jayesh A Patel
(74) *Attorney, Agent, or Firm* — Knobbe, Martens, Olson & Bear LLP

(57) ABSTRACT

Systems and methods are described for natural language processing of a text sequence. The system can identify a set of text and location information for the set of text in an image. The set of text may correspond to an input sequence space. The system can project embeddings of the text into a latent space for processing. Further, the system can reproject the processed embeddings from the latent space to the input sequence space. The system may perform multiple stages of projecting the embeddings to the latent space and reprojecting the processed embeddings from the latent space to the input sequence space. The system can route the reprojected embeddings to a neural network that can identify class predictions for elements of the set of text.

20 Claims, 6 Drawing Sheets

(56) References Cited

U.S. PATENT DOCUMENTS

| | | | |
|---|---|---|---|
| 2022/0058383 A1* | 2/2022 | Seth | G06F 18/24 |
| 2022/0121679 A1* | 4/2022 | Singh | G06V 10/82 |
| 2022/0156300 A1* | 5/2022 | Paruchuri | G06F 16/322 |
| 2022/0230013 A1* | 7/2022 | Krishnamurthy | G06V 10/25 |
| 2022/0405524 A1* | 12/2022 | Yuan | G06F 18/214 |

OTHER PUBLICATIONS

LayoutLM: Pre-training of Text and Layout for Document Image Understanding, Yiheng Xu et al., KDD, Aug. 2020, pp. 1192-1200 (Year: 2020).*

Unified Pretraining Framework for Document Understanding, Jiuxiang Gu et al., NEURIPS, 2021, pp. 1-12 (Year: 2021).*

* cited by examiner

300A

302

| Average Nutritional Value per 100 g | | Per serving 83 g |
|---|---|---|
| Valeuir Nuetritives moyennes pour 100 g | | Par server 83 g |
| Energy / Energie | 358 kcal / 1518 KJ | 297 kcal / 1269 KJ |
| Proteins / Proteines | 10.4 g | 8.6 g |
| Carbohydrates / Glucides | 74 g | 61.4 g |
| Fat / Lipides | 1.6 g | 1.3 g |
| Fibre / Fibre | 3 g | 2.5 g |
| Sodium / Sodium | 0.004 g | 0.003 g |
| ......... | ......... | ......... |

FIG. 3A

|  | 304 | | |
|---|---|---|---|
|  | 306A | 306B | |
|  | Average Nutritional Value per 100 g | | Per serving 83 g |
|  | Valeuir Nuetritives moyennes pour 100 g | | Par server 83 g |
| 308A — Energy / Energie | 358 kcal / 1518 KJ | 308B — 297 kcal / 1269 KJ | |
| 310A — Proteins / Proteines | 10.4 g | 310B — 8.6 g | |
| 312A — Carbohydrates / Glucides | 74 g | 312B — 61.4 g | |
| 314A — Fat / Lipides | 1.6 g | 314B — 1.3 g | |
| Fibre / Fibre | 3 g | 2.5 g | |
| Sodium / Sodium | 0.004 g | 0.003 g | |
| ........ | ........ | ........ | |

LATENT SPACE ENCODING OF TEXT FOR NAMED ENTITY RECOGNITION

BACKGROUND OF THE INVENTION

Natural language processing systems include various modules and components for identifying text and determining what the text means. In some implementations, a natural language processing system includes an optical character recognition module that receives image data of an image containing text and generates text data corresponding to the text of the image data. Natural language processing ("NLP") systems may also include a natural language understanding ("NLU") module that receives text data generated by the optical character recognition module and determines the meaning of the text in a way that can be acted upon, such as by a computer application. The NLU module can identify particular words (e.g., named entities) in the transcription that are of particular importance in determining the user's intent and determine one or more named entities associated with the particular words (e.g., perform named entity recognition ("NER")). The NLP system may also produce a response based on the named entities. For example, the NLP system may provide a description of the text data for output as a response.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 3A depicts an example pictorial diagram of an image including text data.

FIG. 3B depicts an example pictorial diagram of an annotated image in accordance with aspects of the present disclosure.

DETAILED DESCRIPTION

Figure 1:
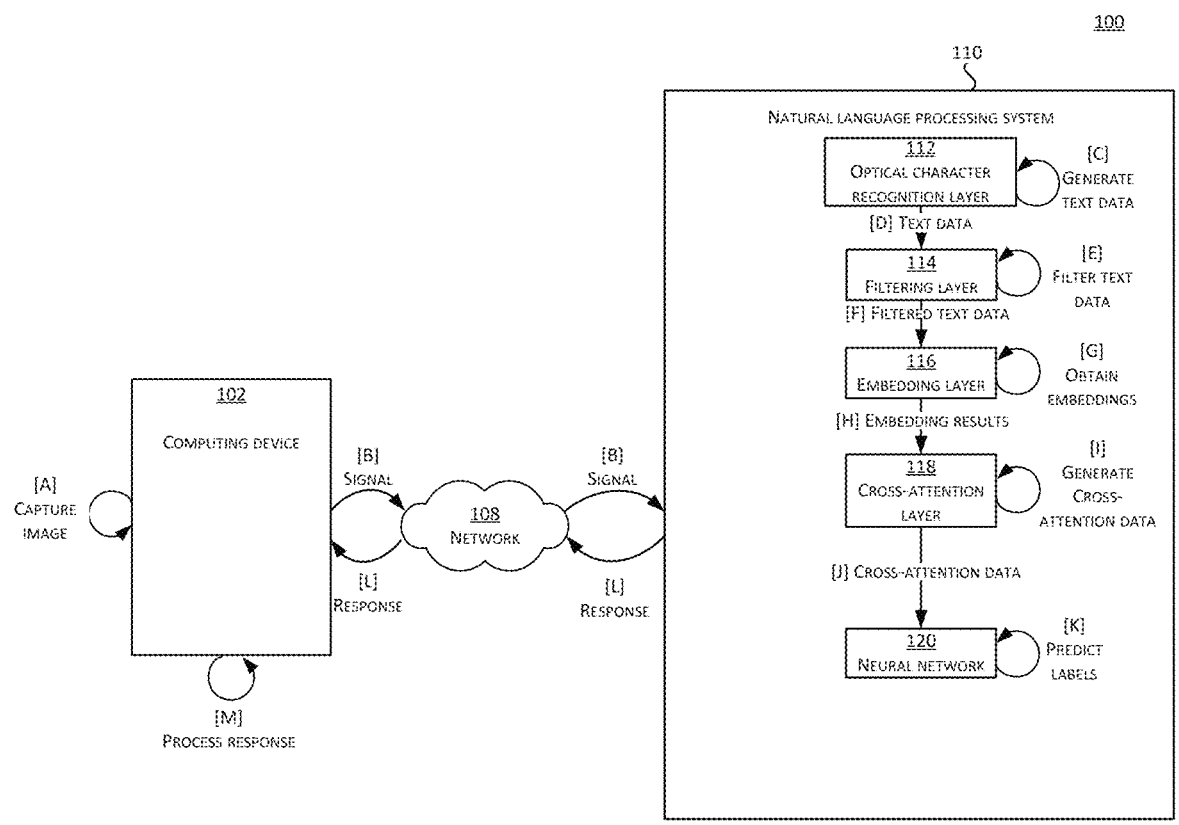
FIG. 1 depicts a schematic diagram of a natural language processing system, including a cross-attention layer in accordance with aspects of the present disclosure.

Generally described, aspects of the present disclosure relate to an NLP system that can extract text (e.g., text sequences) from images containing text-based information. For example, a given image may include a plurality of text-based information (e.g., a picture of a nutrition label on a food item). It may be desirable to extract the text from the image (e.g., in order to parse the nutrition label) and the NLP system can extract the text as text sequences in order to identify a meaning of the text-based information located in the image. Each text sequence may correspond to a line, a portion, or any other grouping of the text. Further, each text sequence may include any number of elements or tokens (e.g., letters, words, etc.). The NLP system can identify multiple text sequences from the text-based information of the image. Further, the NLP system can classify each text sequence (and each word of each text sequence) based on the multiple text sequences of the text-based information. The NLP system enables users to classify and/or label each text sequence and each portion of each text sequence (e.g., individual words of each text sequence) for any amount of text-based information (e.g., any number or length of text sequences). The NLP system may enable users to perform NER on any amount of text-based information without an exponential reduction in efficiency or accuracy. For example, the NLP system can enable users to perform NER to extract nutritional information from an image of a food product (e.g., nutritional information from a carton of orange juice), determine if the extracted information includes nutritional information, validate the format of the nutritional information (e.g., whether the nutritional information is illustrated in per 100 g or 100 ml dosage), and extract particular nutritional information in key-value pairs (e.g., protein and a corresponding protein amount, sugar and a corresponding sugar amount, etc.). More specifically, embodiments of the present disclosure relate to improving the performance of an NLP system that is implemented using various computing resources. As described in detail herein, the NLP system may provide a network-accessible service that obtains images containing any amount of text-based information and parses the text-based information to identify or classify each text sequence of the text-based information. For example, the NLP system may perform NER to identify named entities within the text-based information.

The NLP system can identify the text sequences from the image and utilize location information of each text sequence in order to classify and/or label the text sequences within the image (e.g., the NLP system may perform NER on each text sequence). By classifying the words or a text sequence from any amount of text-based information (e.g., based on any number of text sequences), the NLP system can classify text-based information based on each text sequence within the text-based information. Further, aspects of the present disclosure relate to the architecture of the NLP system for performing the text extraction and classifying each text sequence. Further, the NLP system can include a transformer architecture (e.g., a transformer-based pipeline) that enables the identification and extraction of text sequences from the text-based information and subsequent classification of each of the text sequences. The transformer architecture may include one or more neural networks in order to implement an attention mechanism. The attention mechanism may enable the neural networks to focus on particular portions or words of a text sequence. The neural networks may compute a weight distribution on the input sequence and assign different values to different elements of the text sequence. For example, the neural networks may assign higher values to elements identified as more relevant. Further, the neural networks may utilize the attention mechanism to encode the elements of the text sequence in a stage-wise manner. However, in order to implement the attention mechanism, the neural network may scale the attention mechanism quadratically based on the size (e.g., length) of a particular text sequence and/or the size of the text-based information. By scaling the attention mechanism quadratically based on the size, the memory and/or computation time required by the neural network to execute the attention mechanism may also increase quadratically. Therefore, a user of a traditional NLP system may be limited to performing text extraction and classification on text sequences or text-based information of a limited size. For example, a user may be limited to parsing a text sequence and/or text-based information with a maximum size of 512 tokens or elements.

As noted above, one issue that may be of particular concern in NLP systems is that of performing NLP on text-based information and/or text sequences of unspecified length. In the event that the text-based information and/or the text sequences surpass a particular size (e.g., 512 tokens or elements), the efficiency, and accuracy may decrease significantly. Therefore, a user may wish to enable an NLP system to receive text-based information of any length and classify the text-based information based on each text sequence within the text-based information. For example, it may be advantageous to enable an NLP system that can receive text-based information of any length and classify each text sequence within the text-based information based on each other text sequence within the text-based information. In traditional NLP systems, the classification of each text sequence may be constrained by a quadratic computational limitation of the attention mechanism. Specifically, the computational expense may increase exponentially as the length of the text-based information increases in traditional NLP systems. Further, in traditional NLP systems, the classification of each text sequence may become less accurate as the length of the text-based information increases. Therefore, traditional NLP systems may operate on the text-based information by operating iteratively on portions of the text-based information and merge the results of the operation. By operating iteratively on portions of the text-based information, the classification of the text sequences may become inaccurate as the classification may depend on the entire context of the text-based information and may be inaccurate if based only a portion of the text-based information. In many conventional cases, implementing a general NLP system on an image may not provide satisfactory results in particular situations (e.g., for images with text-based information that includes over 512 text sequences). A user may not wish to have the outputs iteratively merged without considering the entire context of the set of text sequences. Further, by using NLP systems that do not consider the entire set of text sequences, the efficiency and/or accuracy of the NER task may be decreased. Therefore, in traditional NLP systems, the execution of the NER task may be inefficient and/or have reduced speed as the system may be unable to accurately and efficiently process set of text sequences with a length greater than a particular size (e.g., 512 elements or tokens).

In some embodiments, a user can implement an NLP system that analyzes an entire set of text sequences using a sparse attention mechanism. The sparse attention mechanism may enable the NLP system to analyze an entire set of text sequences with a linear increase in computational time. However, in NLP systems implementing the sparse attention mechanism, the set of text sequences may not be analyzed or parsed in a stage-wise manner. Instead, the set of text sequences may be analyzed iteratively and the previously analyzed text sequences may not be utilized to analyze additional text sequences. Further, analyzing the set of text sequences iteratively may be inefficient. For example, analyzing text sequences without considering previously analyzed text sequences may be inefficient and resource intensive. This can lead to an inadequate performance and is generally detrimental to the goal of enabling users to analyze an entire set of text sequences in view of the entire set of text sequences.

Embodiments of the present disclosure address these problems by enabling a transformer architecture of the NLP system to project the text to a latent space by using a cross-attention mechanism and projecting transformed text to an input sequence space by using a reversed cross-attention mechanism. The NLP system can include a transformer architecture to receive the text (e.g., embeddings representing the text). For example, the NLP system can receive the text as a sequence of embeddings (e.g., a sequence of word embeddings) in an input sequence space. The NLP system can receive the text and project the text to a latent space using a cross-attention mechanism. Based on projecting the text to the latent space, the NLP system can perform one or more latent transformations on the projected text and generate transformed text. Further, the NLP system can project the transformed text to the input sequence space using a reversed cross-attention mechanism. By projecting the text to the latent space using the cross-attention mechanism and performing the latent transformations on the text in the latent space, the transformer architecture can analyze a set of text sequences and/or text-based information with any length or size. Further, the NLP system can implement a stage-wise process for projecting the text to the latent space and reprojecting the text to the input sequence space. For example, each stage of the stage-wise process may include a projection of the text to the latent space, a transformation of the text, and a reprojection of the transformed text to the input sequence space. Therefore, each stage of the stage-wise process may generate an independent prediction and a refinement of the stage-wise process for use in subsequent stages. Each subsequent stage of the stage-wise process may receive results of the transformation of the text from a prior stage and may project the transformed text to the latent space for further transformation and reproject of the further transformed text to the input sequence space. The NLP system may include any number of projection and reprojection stages.

By using the transformer architecture to project the text to a latent space for latent transformations, the NLP system can break the computational constraints associated with the attention mechanism. Specifically, the transformer architecture may implement a cross-attention mechanism to classify the text. More specifically, embodiments of the present disclosure relate to improving the performance of an NLP system by utilizing a transformer architecture that implements the cross-attention mechanism in order to classify text. As described in detail herein, the NLP system may utilize the transformer architecture to project a text sequence into a latent space using the cross-attention mechanism. Further, the NLP system may perform latent transformations on the projected text sequence and project the transformed text sequence into the input space using a reversed cross-attention mechanism. The output of the reversed cross-attention mechanism can be passed to a neural network in order to provide a classification of the text. Thus, the NLP system may enable a refinement of classifications by projecting the text into a latent space which can increase the ability of the NLP system to classify text from sequences of text with unknown length. Further, the NLP system can enable full context sequence processing for any sequence of task. The NLP system may be configured to classify text from a text sequence with unknown, unspecified, etc. length in a rapid manner.

Further, the NLP system may include an embedding module to generate embeddings of the text and filter the portion of text provided to the transformer architecture. The NLP system may include an embedding module to generate the word and character embeddings. The embedding module can further identify positional embeddings of the bounding box coordinates of each word. The embedding module may be any conventional embedding models. In some embodiments, the embedding module may be implemented using GloVe models, fastText models, Word2vec models, ELMo models, or other word embedding modelling methods. The embedding module may generate encoded representations of each word in the input in the relevant context. The encoded representations of the embedding module, or information derived therefrom may include as output of a bi-directional long shot-term memory model ("BiLSTM"). The NLP system may pass the embeddings to a classifier to predict whether particular words, based on the embeddings, are relevant or irrelevant. The classifier may identify a particular task (e.g., identify nutritional information) and may predict whether particular words are relevant to the particular task. For example, the classifier may determine that the word "football" is irrelevant to the task "identify nutritional information" and the word "sugars" is relevant to the same task. The NLP system may filter the predicted irrelevant words such that the transformer architecture need not project the irrelevant words to the latent space. Therefore, the NLP system can reduce the computational requirements of the transformer architecture.

As will be appreciated by one of skill in the art in light of the present disclosure, the embodiments disclosed herein improve the ability of computing systems, such as NLP systems, to perform NER for text-based information extracted from an image. Moreover, the presently disclosed embodiments address technical problems inherent within computing systems; specifically, the difficulties of extracting text and performing NER on text sequences and/or text-based information with lengths greater than a particular length (e.g., with lengths greater than 512 elements or tokens). These technical problems are addressed by the various technical solutions described herein, including projecting the text to a latent space using an attention mechanism, transforming the text, and reprojecting the text to an input sequence space. By projecting the text to a latent space for transformation of the text, the NLP system can accurately and efficiently perform NER. Thus, the present disclosure represents an improvement on existing NLP systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which a natural language processing system 110 may be implemented and interact with a computing device 102 via a network 108. By way of illustration, various example computing devices 102 are shown in communication with the NLP system 110, including a desktop computer, laptop, and a mobile phone. In general, the computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The NLP system 110 may provide the computing devices 102 with one or more user interfaces, command-line interfaces (CLI), application programing interfaces (API), and/or other programmatic interfaces for generating and uploading an image (e.g., an image that contains text-based information), and receiving the results of the NER task (e.g., an annotated image). Although one or more embodiments may be described herein as using a user interface, it should be appreciated that such embodiments may, additionally or alternatively, use any CLIs, APIs, or other programmatic interfaces.

A user may utilize the computing device 102 in order to capture image data of a scene. Further, the computing device 102 may capture image data of a scene that includes text-based information. For example, the computing device 102 may capture image data of a scene that includes a nutrition label that includes particular nutrition information. Further, the computing device 102 may generate a signal with information regarding the captured image data.

The computing device 102 may send the signal (e.g., the captured image data or metadata associated with the captured image data) to the NLP system 110 over one or more networks 108. The one or more networks 108 may include any viable communication technology, such as wired and/or wireless modalities and/or technologies. The one or more networks 108 may include any combination of Personal Area Networks ("PANs"), Local Area Networks ("LANs"), Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs")—both centralized and/or distributed—and/or any combination, permutation, and/or aggregation thereof. Any of the one or more networks 108 may include, and/or may or may not have access to and/or from, the internet.

The NLP system 110 may include various components for providing the features described herein. In some embodiments, the NLP system 110 may include an optical character recognition layer 112 to generate text data from the image data from the computing device 102. Further, the NLP system 110 can include a filtering layer 114 to filter the text data. The NLP system 110 may also include an embedding layer 116 to generate embeddings based on the filtered text data. Further, the NLP system 110 may include a cross-attention layer 118 to project the embeddings to a latent space using a cross-attention mechanism, transform the projected embeddings using a latent transformation, and reproject the transformed embeddings to an input space using a reversed cross-attention mechanism. The NLP system 110 may also include a neural network 120 to predict labels (e.g., to classify) the text and generate a NER output based on the output of the cross-attention layer 118.

The NLP system 110 may further include an applications system. The applications system may be configured to initiate an appropriate application in response to the image data received from computing device 102 and the predicted meaning or classification of the text from the image data. The applications system can initiate an application to display annotated image data that identifies one or more text sequences based on the NER task. For example, the applications system can cause display of annotated image data via an application. The example subsystems and components of the NLP system 110 shown in FIG. 1 are illustrative only, and are not intended to be limiting. In some embodiments, an NLP system 110 may have fewer, additional, and/or alternative components and data stores.

The NLP system 110 may be implemented on one or more physical server computing devices that provide computing services and resources to end-user devices, such as the computing device 102. In some embodiments, the NLP system 110 (or individual components thereof) may be implemented on one or more host devices, such as blade servers, midrange computing devices, mainframe computers, desktop computers, or any other computing device configured to provide computing services and resources. For example, a single host device may execute one or more optical character recognition layers 112, filtering layers 114, embedding layers 116, cross-attention layers 118, neural networks 120, some combination thereof, etc. The NLP system 110 may include any number of such hosts.

In some embodiments, the features and services provided by the NLP system 110 may be implemented as web services consumable via one or more communication networks. In further embodiments, the NLP system 110 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

With reference to an illustrative embodiment, at [A] the computing device 102 can capture an image. Further, the computing device 102 can capture the image as image data. The image can include any text-based information. For example, the image may include an image of a product with a nutritional label. In some embodiments, the image may not include any text-based information and the NLP system 110 may verify that the image does not include text-based information.

At [B], the computing device 102 can send the image data as a signal to the NLP system 110 via the network 108. In some embodiments, the computing device 102 may send the image data, via the signal, to the NLP system 110. In other embodiments, the computing device 102 may send the image data, via the signal, to a data store or another computing system for storage and access by the NLP system 110. For example, the computing device 102 may upload the image data to a marketplace system for offering a particular product for sale associated with the image data. Based on determining the computing device 102 has uploaded the image data, the NLP system 110 may access the image data. Therefore, the NLP system 110 can obtain the image data in order to perform the NER task.

At [C], the optical character recognition layer 112 of the NLP system 110 can generate text data using the obtained image data. The text data may include one or more text sequences and location information of the one or more text sequences within the image data. For example, the text data can include a list of words (x1, x2, . . . xM) and a list of coordinates for each word ([x, y], [y, z], . . . [x, z]). The optical character recognition layer 112 may parse the image data and extract the one or more text sequences (e.g., one or more groups of characters within the image data) from the text-based information of the image data. Further, the optical character recognition layer 112 may identify location information (e.g., bounding box coordinates) of each of the one or more text sequences and/or each of the characters within the image data. For example, the optical character recognition layer 112 may identify a location of a particular text sequence relative to the entire image. The optical character recognition layer 112 may identify the location information as an image space within the image data (e.g., a subset or portion of the image data). For example, the optical character recognition layer 113 may identify a top left corner with respect to an image space of a particular text sequence and/or a particular character. Further, the optical character recognition layer 112 may identify a width and/or height of the image space of the particular text sequence and/or the particular character. In some embodiments, the optical character recognition layer 112 may normalize the location information for each of the one or more text sequences. Therefore, the optical character recognition layer 112 can generate text data that identifies one or more text sequences and location information for each of the one or more text sequences. At [D], the optical character recognition layer 112 can provide the text data to the filtering layer 114.

At [E], the filtering layer 114 of the NLP system 110 can filter the text data from the optical character recognition layer 112. In some embodiments, the optical character recognition layer 112 may pass the text data directly to the embedding layer 116 and the text data may not be filtered. The filtering layer 114 can filter the text data to remove one or more text sequences that are predicted to be irrelevant to a particular task. In order to filter the text data, the filtering layer 114 may identify one or more labels for the one or more text sequences from the optical character recognition layer 112. For example, the one or more text sequences may include "Average, per, 100 g, Energy, 358 kcal" and the filtering layer 114 can identify the labels as "Other, per100, per100, Energy-key, Energy-value." In order to identify the labels, the filtering layer 114 can include a bidirectional long short term memory ("BiLSTM") model or layer to generate BiLSTM results (e.g., the labels). The BiLSTM results may represent probabilities that words correspond to particular labels. The BiLSTM model can generate one or more numerical values for each of the embedding results. For example, the BiLSTM model can generate a first numerical value (e.g., 0.5) representing a probability that "Acme" corresponds to an "Organization" and a second numerical value (e.g., 0.1) representing a probability that "Acme" corresponds to a "Person." It will be understood that the BiLSTM model can generate any number of numerical values for a given text sequence. Each numerical value may correspond to a given category or classification associated with a particular label (e.g., a particular named entity). Each token associated with an input vector of the embedding layer may receive a numerical value for each category or classification. For example, for the phrase "Energy: 10 kcal," each of "Energy" and "10 kcal" may receive a numerical value for the following classifications: "Other," "Energy-key," "Energy-value," etc. Each portion of a particular text sequence may correspond to BiLSTM results corresponding to a BiLSTM vector including a plurality of numerical values.

The filtering layer 114 may implement a binary classifier in order to filter the text data based on the labels of the text sequences. The filtering layer 114 may remove one or more text sequences from text data with labels that are identified as irrelevant by the binary classifier. For example, the filtering layer 114 may identify that the label "Other" identifies irrelevant text and may remove text sequences with the label "Other" from the text data. In some embodiments, the filtering layer 114 may not remove text sequences with labels corresponding to numbers (e.g., text sequences that are identified by the BiLSTM model as including numerical values). At [F], the filtering layer 114 can provide the filtered text data to the embedding layer 116.

At [G], the embedding layer 116 can use the filtered text data obtained from the filtering layer 114 in order to obtain embeddings for the filtered text data. The embedding layer 116 may identify the embeddings within an input sequence space. Further, the embedding layer 116 can obtain word and/or character embeddings for each text sequence of the filtered text data and positional embeddings for the location of each text sequence. The embedding layer 116 may be trained on a particular language corpus to identify an encoding representation (e.g., the embeddings of each text sequence). Therefore, the embedding layer 116 can learn the word and/or character embeddings for each text sequence.

Further, the embedding layer 116 can identify fixed positional embeddings for the location of each text sequence based on the location information of the text sequence respective to the particular image data. In some embodiments, the embedding layer 116 may be configured as a word embedding module. The embedding layer 116 can generate a word embedding output using the filtered text data received at [F]. In some embodiments, the embedding layer 116 can generate a word embedding output using text data received from the optical character recognition layer 112. The embedding layer 116 can receive text data (filtered or unfiltered) as a set of text sequences. For example, the embedding layer 116 can receive a text sequence of "Buy ten Acme widgets" which may be divided into a plurality of tokens such as "Buy," "ten," "Acme," "widgets." For example, the embedding layer 116 may divide the text sequence into a plurality of tokens using a unigram language model. In other examples, one or more tokens may include a plurality of words. The embedding layer 116 can generate multiple word embeddings for each token. Each word embedding output may represent a corresponding word in a numerical manner. In some embodiments, a character embedding of a given word represented in numerical format may be generated prior to generation a word embedding, and the word embedding may be generated based on the character embedding instead of, or in addition to, the word text. At [H], the embedding layer 116 can provide the word embedding results to the cross-attention layer 118.

At [I], the cross-attention layer 118 can use the word embedding results to generate cross-attention data. The cross-attention layer 118 may include a transformer architecture to perform the cross-attention mechanism. For example, the cross-attention layer 118 may include one or more encoders and/or decoders to perform the cross-attention mechanism. The cross-attention layer 118 may provide the word and/or character embeddings of the text data and the corresponding positional embeddings to an encoder. Each of the embeddings may include one or more keys, values, and/or queries. For example, the embeddings may include a query corresponding to a particular label of a portion of the text data and particular key-value pairs associated with the portion of the text data and the query. The encoder may include an attention network to identify particular word and/or character embeddings and corresponding positional embeddings. Further, the encoder can include a feedforward network to pass keys and values of the particular word and/or character embeddings and corresponding positional embeddings to a decoder. The cross-attention layer 118 may provide embeddings (positional and word and/or character embeddings) for latent information to the decoder. The decoder may include a first attention network to identify particular embeddings of the latent information. The decoder may further include a second attention network that receives the keys and values of the embeddings of the text data and the queries of the embeddings of the latent information to identify particular embeddings. Further, the decoder may include a feedforward network to pass projected latent information for transformation. The cross-attention layer 118 may apply the cross-attention mechanism as identified in Equation 1 as seen below.

$$\Theta(E, L) + \text{softmax}\left(\frac{q(E)k(L)^T}{\sqrt{d}}\right)v(L) \qquad \text{Equation 1}$$

In Equation 1, $\Theta$ may be the cross-attention mechanism, E may be the embeddings, L may be the latent information (e.g., a latent block), softmax may be a softmax function, k may be the keys of the latent information, v may be the values of the latent information, q may be the queries of the embeddings, d may be the dimensions of the embeddings, and T may be a particular stage within a stage-wise process. In some embodiments, the stage-wise process may include one stage. In other embodiments, the stage-wise process may include multiple stages. By applying the cross-attention mechanism, the cross-attention layer 118 can project the embeddings to a latent space using the cross-attention mechanism. The cross-attention layer 118 can generate projected latent information based on applying the cross-attention mechanism as identified in Equation 2 below.

$$L_\Theta^{INIT} = \Theta(E, L^{INIT}) \qquad \text{Equation 2}$$

In Equation 2, $L_\Theta^{INIT}$ may be the projected latent information, $\theta$ may be the cross-attention mechanism, E may be the embeddings, $L^{INIT}$ may be the initial latent information.

The cross-attention layer 118 may obtain the projected latent information and apply one or more latent transformations to the projected latent information. For example, the cross-attention layer 118 may pass the projected latent information through a transformer encoder. The cross-attention layer 118 may add the initial latent information as residual information on the resulting transformed latent information. The cross-attention layer 118 can generate the transformed latent information as identified in Equation 3 below.

$$L\Gamma^{INIT} = \Gamma(L_\Theta^{INIT}) + L^{INIT} \qquad \text{Equation 3}$$

In Equation 3, $L_\Gamma^{INIT}$ may be the transformed latent information, $\Gamma$ may be the latent transformation, $L_\Theta^{INIT}$ may be the projected latent information, and $L^{INIT}$ may be the initial latent information. $L^{INIT}$ may be learned via training of the cross-attention layer 118. The cross-attention layer 118 may be tuned to perform the cross-attention and reversed cross-attention mechanism. The tuning of the cross-attention layer 118 may involve training a weighting factor or a weight (e.g., the initial latent information) used to adjust the output of the cross-attention layer 118. To adjust the weighting factor of the cross-attention layer, the cross-attention layer 118 may be provided with tokens properly within a particular classification and may also intentionally include tokens not properly within the classification (e.g., resulting in "false positives"). By adjusting the tokens provided to the cross-attention layer 118, the weighting factor of the cross-attention layer 118 can be adjusted.

Further, in order to perform the training, the cross-attention layer 118 may be provided with a training data set (e.g., a set of tokens) for training. For example, the training data set may correspond to known text sequences (e.g., tokens) associated with particular nutritional terms (e.g., sugar, fiber, per 100 g, carbohydrates, etc.). The training data set may further include one or more known annotations associated with particular text sequences and identifying named entity classifications for each of the text sequences. For example, the training data set may include known annotated image data for a nutritional label. False positives tokens can be added to the training data set. The false positive tokens may include text sequences that are associated with incorrect annotations (e.g., named entity classifications that do not correspond to the particular text sequence). The cross-attention layer 118 may train at least in part on the training data set including the false positive tokens. Based on the output of the cross-attention layer 118 using the training data set including the false positive tokens, the NLP system 110 can adjust the weights of the cross-attention layer 118 to generate a trained cross-attention layer. Further, the NLP system 110 may receive the trained cross-attention layer 118 to perform the cross-attention. The trained cross-attention layer 118 may generate the $L^{INIT}$ (e.g., the initial latent information) as a weight for use by a first stage of a stage-wise process. Further, the trained cross-attention layer 118 and the tuned weight can be applied to predict information in subsequent data sets. Further stages of the stage-wise process may adjust the $L^{INIT}$ based on the output of subsequent stages.

The cross-attention layer 118 may obtain the transformed latent information and apply a reversed cross-attention mechanism. By applying the reversed cross-attention mechanism, the cross-attention layer 118 may reproject the transformed latent information to the input sequence space. The cross-attention layer 118 can generate the updated latent information by applying the reversed cross-attention mechanism as identified in Equation 4 below.

$$\Theta_{Rev}(E, L) + \text{softmax}\left(\frac{q(L)k(E)^T}{\sqrt{d}}\right)v(E) \qquad \text{Equation 4}$$

In Equation 4, $\Theta_{Rev}$ may be the reversed cross-attention mechanism, E may be the embeddings, L may be the transformed latent information, softmax may be a softmax function, k may be the keys of the embeddings, v may be the values of embeddings, q may be the queries of the latent information, d may be the dimensions of the embeddings, and T may be a particular stage within a stage-wise process. The cross-attention layer 118 can generate processed latent information based on applying the cross-attention mechanism as identified in Equation 5 below.

$$L_{\Theta,Rev}^{INIT} = \Theta_{Rev}(E, L_T^{INIT}) \qquad \text{Equation 5}$$

In Equation 5, $L_{\Theta,Rev}^{INIT}$ may be the processed latent information, $\Theta_{Rev}$ may be the reversed cross-attention mechanism, E may be the embeddings, and $L_T^{INIT}$ may be the transformed latent information. The cross-attention layer 118 can generate cross-attention data based on the processed latent information.

In some embodiments, the cross-attention layer 118 may perform the cross-attention in a stage-wise manner. For example, each stage of the stage-wise process may include a projection of data to a latent space using a cross-attention mechanism, performance of a latent transformation, and reprojection of the transformed data to the initial sequence space using a reversed cross-attention mechanism. An initial stage of the stage-wise process may receive base or initial latent information (e.g., an initial latent block) for the cross-attention mechanism. For example, the cross-attention layer 118 may identify a base or initial latent information based on an average latent information for prior cross-attention mechanisms. For subsequent stages of the stage-wise process, the output of the reprojection of the transformed data to the initial sequence space from an immediately prior stage may be provided as latent information for the stage. It will be understood that the cross-attention layer 118 can perform any number of layers of projection of data to a latent space using a cross-attention mechanism, performance of a latent transformation, and reprojection of the transformed data to the initial sequence space using a reversed cross-attention mechanism. For example, the cross-attention layer 118 may include a single layer.

The cross-attention layer 118 may perform the cross-attention in a stage-wise manner by passing cross-attention data as weight factor for a subsequent stage. For example, the cross-attention data may be provided as a weight factor for a feedforward module and/or attention mechanism for a subsequent stage. The cross-attention layer 118 can generate the updated latent information for the subsequent stage as identified in Equation 6 below.

$$\Theta_{Rev}(E, L, A) + \text{softmax}\left(\frac{q(L)k(E)^T}{\sqrt{d}} \odot A\right)v(E) \qquad \text{Equation 6}$$

In Equation 6, $\Theta_{Rev}$ may be the reversed cross-attention mechanism, $\odot$ may be the Hadamard product, A may be a weight factor (e.g., a matric of weight factors), E may be the embeddings, L may be the transformed latent information, softmax may be a softmax function, k may be the keys of the embeddings, v may be the values of embeddings, q may be the queries of the latent information, d may be the dimensions of the embeddings, and T may be a particular stage within a stage-wise process. The cross-attention layer 118 can generate processed latent information based on applying the cross-attention mechanism for the subsequent stage as identified in Equation 7 below.

$$L_{\Theta,Rev}^t = \Theta_{Rev}(E, L_T^t, \Phi(Y^{t-1})) \qquad \text{Equation 7}$$

In Equation 7, $L_{\Theta,Rev}^t$ may be the processed latent information, $\Theta_{Rev}$ may be the reversed cross-attention mechanism, E may be the embeddings, $L_T^t$ may be the transformed latent information, $\Phi$ may be a projection function, and $Y^{t-1}$ may be a weight factor (e.g., a matrix of weight factors). The cross-attention layer 118 can generate cross-attention data based on the processed latent information.

At [J], the cross-attention layer 118 can provide the cross-attention data to the neural network 120. The cross-attention data may include a sequence of labels for each portion of the text-based data. For example, the cross-attention data may include labels "per100, per100, other, other, salt-key, salt-value, fat-key, fat-value, other." At [K], the neural network 120 can predict labels for each portion of the text-based information based on the cross-attention data. Further, the neural network 120 can dynamically assign labels to each portion of the text-based information. Further, the neural network 120 may generate a response or otherwise perform an action based on the labels or classification assigned to particular portions of the text-based information.

At [L], the NLP system 110 can transmit a response to the computing device 102. The NLP system 110 can transmit the response to the computing device 102 via the network 108. In some embodiments, the NLP system 110 may not transmit a response to the computing device 102 and may use the identified labels to perform one or more operations. Further, the NLP system 110 may cause display, at the computing device 102 or at a different device, of the labels for each portion of the text-based information. For example, in response to a prompt by the computing device 102, the NLP system 110 can cause display of a particular portion of the text-based information. The computing device 102 can process the response at [M].

Figure 2:
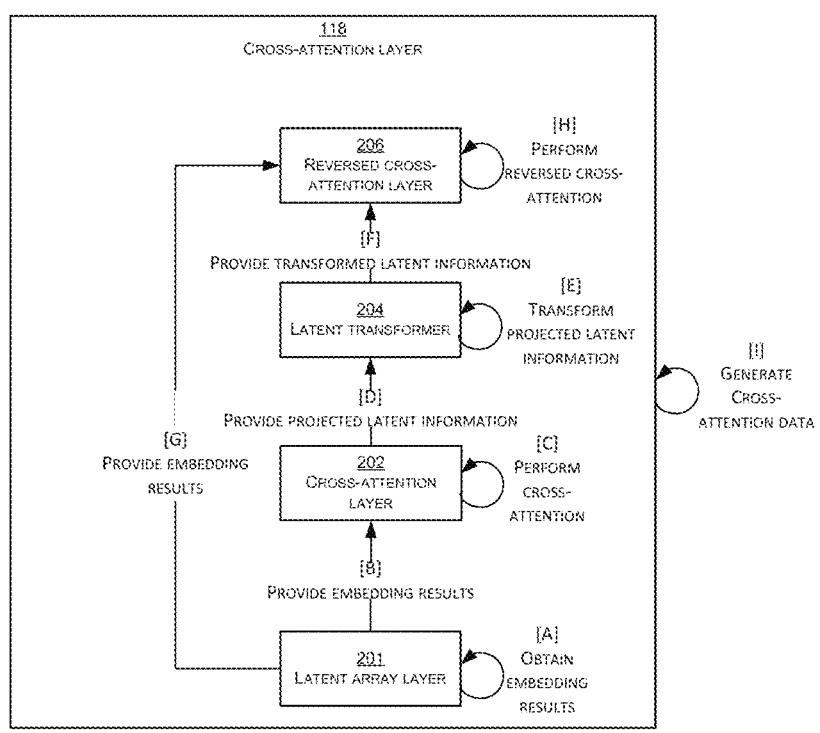
FIG. 2 depicts a schematic diagram of a cross-attention layer of a natural language processing system in accordance with aspects of the present disclosure.

FIG. 2 is a block diagram of an illustrative operating environment 200 in which a cross-attention layer 118 of an NLP system 110 may be implemented. As described above, the cross-attention layer 118 may be a component of the NLP system 110 and may perform one or more operations including projecting data to a latent space using a cross-attention mechanism, performing one or more latent transformations on the projected data, and reprojecting the data to an input sequence space using a reversed cross-attention mechanism. The cross-attention layer 118 may include various components or layers for performing the one or more operations described herein. In some embodiments, the cross-attention layer 118 can include a latent array layer 201, a cross-attention layer 202, a latent transformer 204, and/or a reversed cross-attention layer 206. In some embodiments, the cross-attention layer 118 may have fewer, additional, and/or alternative components.

With reference to an illustrative embodiment, at [A], the latent array layer 201 can obtain the embedding results. As described above, the latent array layer 201 may obtain the embedding results from an embedding layer. The embedding results may include word embeddings, character embeddings, and/or positional embeddings for text sequences in text-based information of an image. At [B], the latent array layer 201 can provide the embedding results to the cross-attention layer 202.

At [C], the cross-attention layer 202 can obtain the embedding results from the latent array layer 201 and perform cross-attention. The embedding results may correspond to an input sequence space. The cross-attention layer 202 may perform the cross-attention of the embedding results using a cross-attention mechanism. The cross-attention layer 202 can receive the embedding results and latent information (e.g., base or learned latent information and/or latent information from a prior operation or stage of the cross-attention layer 118). The cross-attention layer 202 can utilize the embedding results and the latent information to project the embedding results into a latent space of the latent information. Based on projecting the embedding results into the latent space, the cross-attention layer 202 can generate projected latent information. At [D], the cross-attention layer 202 can provide the projected latent information to the latent transformer 204.

At [E], the latent transformer 204 can transform the projected latent information. The latent transformer 204 may transform the projected latent information by applying one or more latent transformations to the projected latent information. The latent transformations may enable the latent transformer 204 and/or the cross-attention layer 118 to identify or learn relationships between elements of the embeddings. Therefore, based on the learned relationships, the latent transformer 204 can generate the transformed latent information. At [F], the latent transformer 204 can provide the transformed latent information to the reversed cross-attention layer 206. At [G], the latent array layer 201 can provide the embedding results to the reversed cross-attention layer 206.

At [H], the reversed cross-attention layer 206 can obtain the embedding results from the latent array layer 201 and the transformed latent information from the latent transformer 204 and perform a reversed cross-attention. The reversed cross-attention layer 206 may perform the reversed cross-attention of the embedding results and the transformed latent information using a reversed cross-attention mechanism. The reversed cross-attention layer 206 can receive the embedding results and the transformed latent information and utilize the embedding results and the transformed latent information to project the transformed latent information into the input sequence space of the embedding results. Based on projecting the transformed latent information into the input sequence space, at [I], the cross-attention layer 118 can generate cross-attention data (e.g., processed latent information). In some embodiments, the cross-attention layer 118 may provide the cross-attention data to a neural network for further processing. In other embodiments, the cross-attention layer 118 may provide the cross-attention data as input to another stage of the cross-attention layer 118 (e.g., when the cross-attention layer is performing a multi-stage process).

As noted above, in some embodiments, the NLP system 110 may receive image data. The image data may include text-based information and the NLP system 110 may perform NER based on the text-based information. In accordance with aspects of the present disclosure, in order to perform the NER, the NLP system 110 may receive the image data and parse the image data. For example, the NLP system 110 may receive image data associated with a label for a particular product (e.g., a nutrition label for a food item). FIG. 3A illustrates a pictorial diagram depicting an example image data 302 in accordance with aspects of the present disclosure. The example image data 302 may be image data from an image of a nutritional label for a particular food item. A camera, scanner, or any other computing device may capture the image and generate the image data 302. The image data 302 and/or the corresponding image may be associated with a particular task to be performed on the image data 302. For example, the task for the image data 302 may include the identification of nutrition data within the image data 302. Further, the task for the image data 302 may include the identification of nutrition data within the image data 302 and the determination of whether the nutrition data includes particular keys and/or particular key-values.

The image data 302 may include a plurality of text sequences from the text-based information of the image data 302. Each text sequence may be a grouping, collection, or chunk of characters or words that are grouped within the image data 302. The image data 302 may also include additional data, including non-text-based information. For example, the image data 302 may include one or more images, diagrams, or other features that do not include text-based information. The plurality of text sequences may each be associated with particular location information within the image data 302. The location information for a particular text sequence may identify the location of the text sequence within the image data 302.

In the example of FIG. 3A, the image data 302 includes a first text sequence including the text "Average Nutritional Value per 100 g" in a first location of the image data 302, a second text sequence including the text "Per serving 83 g" in a second location of the image data 302, a third text sequence including the text "Valeuir Nuetritives moyennes pour 100 g" in a third location of the image data 302, a fourth text sequence including the text "Par server 83 g" in a fourth location of the image data 302, a fifth text sequence including the text "Energy/Energie" in a fifth location of the image data 302, a sixth text sequence including the text "358 kcal/1518 KJ" in a sixth location of the image data 302, a seventh text sequence including the text "297 kcal/1269 kW" in a seventh location of the image data 302, an eighth text sequence including the text "Proteins/Proteines" in an eighth location of the image data 302, a ninth text sequence including the text "10.4 g" in a ninth location of the image data 302, a tenth text sequence including the text "8.6 g" in a tenth location of the image data 302, an eleventh text sequence including the text "Carbohydrates/Glucides" in an eleventh location of the image data 302, a twelfth text sequence including the text "74 g" in a twelfth location of the image data 302, a thirteenth text sequence including the text "61.4 g" in a thirteenth location of the image data 302, a fourteenth text sequence including the text "Fat/Lipides" in a fourteenth location of the image data 302, a fifteenth text sequence including the text "1.6 g" in a fifteenth location of the image data 302, a sixteenth text sequence including the text "1.3 g" in a sixteenth location of the image data 302, a seventeenth text sequence including the text "Fibre/Fibre" in a seventeenth location of the image data 302, an eighteenth text sequence including the text "3 g" in an eighteenth location of the image data 302, a nineteenth text sequence including the text "2.5 g" in a nineteenth location of the image data 302, a twentieth text sequence including the text "Sodium/Sodium" in a twentieth location of the image data 302, a twenty-first text sequence including the text "0.004 g" in a twenty-first location of the image data 302, and a twenty-second text sequence including the text "0.003 g" in a twenty-second location of the image data 302. It will be understood that the image data 302 may include more, less, or different text sequences. In the example, the text sequences of the image data 302 correspond to multiple languages. It will be understood that the image data 302 may include text sequences corresponding to more, less, or different languages.

FIG. 3B illustrates an example annotated image data 304 that is output by a neural network 120 of the NLP system 110 in accordance with aspects of the present disclosure. Illustratively, the annotated image data 304 may correspond to an annotated version of the image data 302 of FIG. 3A. The neural network 120 may determine particular labels for the text-based information of the image data 302 and generate one or more annotations for the image data 302 for display via the annotated image data 304. Therefore, the annotated image data 304 can correspond to the image data 302 based on the NER task performed by the NLP system 110.

The annotated image data 304 may include a plurality of text sequences. In the example of FIG. 3B, the annotated image data 304 includes the text sequences of the image data 302 of FIG. 3A. Each of the text sequences may be separated by one or more spatial constraints. For example, the text sequences may be separated spatially, based on via one or more boxes (e.g., bounding boxes), tables, columns, rows, etc., or by another spatial constraints.

The annotated image data 304 may further identify text sequences that were identified based on a particular task. For example, the task may be to identify particular nutritional information. Based on the task, the NLP system 110 may identify the particular nutritional information and annotations for each sequence of the nutritional information, as described above, and the neural network may generate annotated image data 304 that identifies the particular nutritional information via annotations. The annotated image data 304 may further identify a label or annotation for each text sequence identified as satisfying the task.

In the example of FIG. 3B, the annotated image data 304 may include a first text sequence 306A "per 100 g" and a first annotation "per 100," a second text sequence 306B "pour 100 g" and a second annotation "per 100," a third text sequence 308A "Energy/Energie" and a third annotation "Energy-key," a fourth text sequence 308B "356 kcal/1518 KJ" and a fourth annotation "Energy-value," a fifth text sequence 310A "Proteins/Proteines" and a fifth annotation "Protein-key," a sixth text sequence 310B "10.4 g" and a sixth annotation "Protein-value," a seventh text sequence 312A "Carbohydrates/Glucides" and a seventh annotation "Carbohydrates-key," an eight text sequence 312B "74 g" and an eight annotation "Carbohyrdates-value," a ninth text sequence 314A "Fat/Lipides" and a ninth annotation "Fat-key," and a tenth text sequence 314B "1.6 g" and a tenth annotation "Fat-value." It will be understood that the annotated image data 304 may include more, less, or different text sequences. Further, it will be understood that the annotated image data 304 may include more, less, or different annotations.

Figure 4:
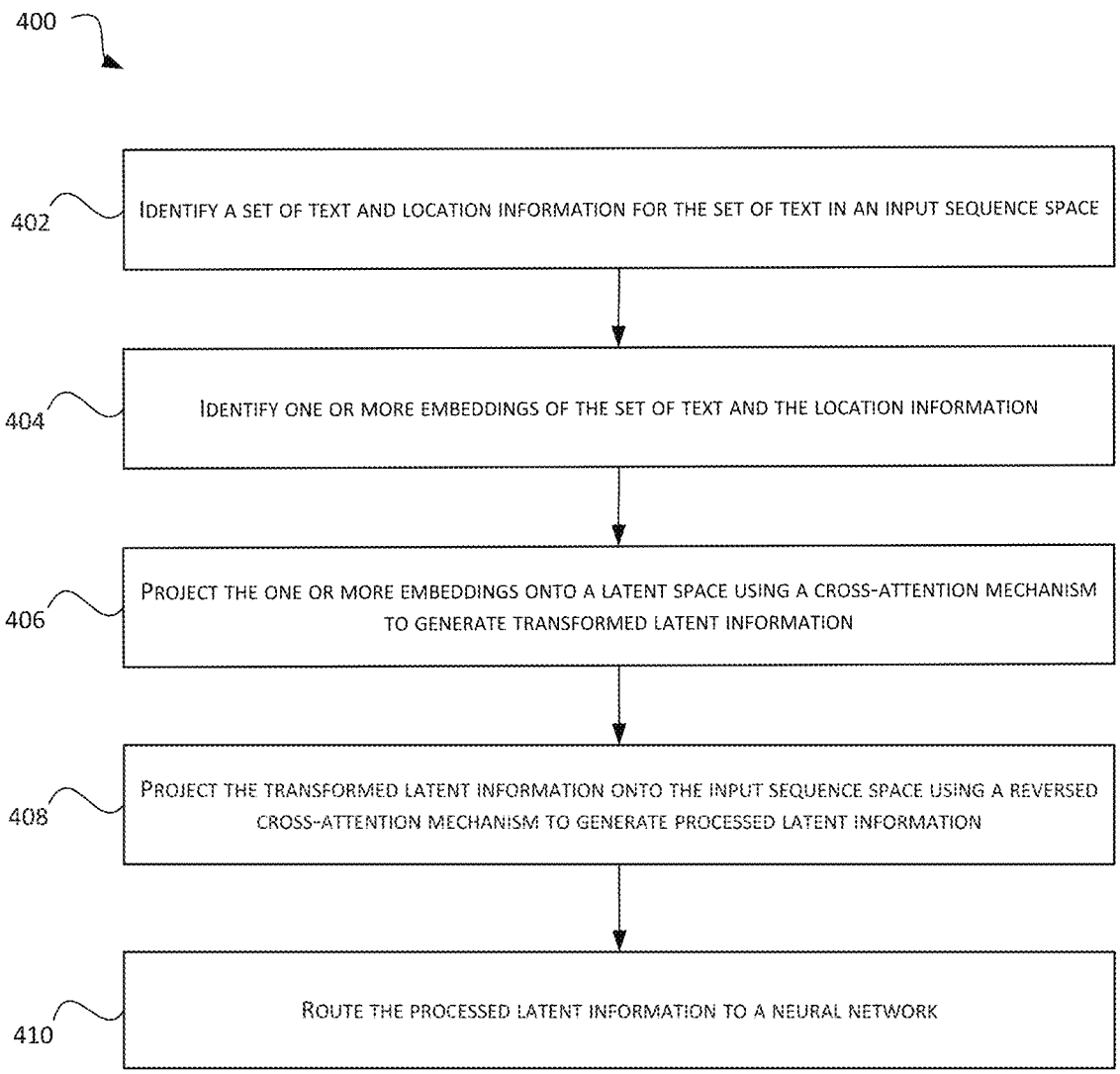
FIG. 4 is a flow chart depicting an illustrative routine for classifying words of a sequence of task.

With reference to FIG. 4, an illustrative routine 400 will be described for performing the NER task on a set of text sequences. The routine 400 may be implemented for example, by the NLP system 110 of FIG. 1. The routine 400 begins at block 402, the NLP system identifies a set of text and location information for the set of text in an input sequence space. The NLP system may identify the set of text and location information for the set of text from an image. For example, the NLP system may obtain an image (e.g., from a user computing device) and identify the set of text within the image and location information identifying the location of the set of text within the image. In some embodiments, the location information may be a set of bounding box coordinates associated with the image for each text sequence of the set of text. The NLP system may identify the set of text (e.g., extract nutritional data from the image) by identifying one or more keys associated with a task, identifying the one or more keys in the image, and identifying one or more key-values in the image associated with the one or more keys in the image. The set of text may include the one or more keys and the one or more key-values.

Further, in order to identify the set of text, the NLP system may classify a plurality of text using a neural network (e.g., a neural network layer) to identify probabilistic data regarding a classification of one or more text sequences (e.g., words) of the plurality of text. Further, the NLP system may filter the plurality of text based on the probabilistic data to identify the set of text. Further, the NLP system may identify a task associated with the image (e.g., identify particular nutritional text-based information within the image) and may classify a plurality of text using the neural network to identify the probabilistic data regarding a classification of one or more words of the plurality of the text. The probabilistic data may identify a probability of an association with the task for each of the one or more words. Further, the NLP system can filter the plurality of text based on the probabilistic data to identify the set of text associated with the task. In some embodiments, the NLP system may identify a portion of the plurality of text corresponding to one or more numbers (e.g., numerical values) and filter the plurality of text to identify the set of text which includes the portion of the plurality of text based on the portion of the plurality of text corresponding or including one or more numbers.

In some embodiments, the NLP system may determine an amount of text of the image associated with the set of bounding box coordinates based on the image. For example, the NLP system may parse the image to determine if the set of text corresponds to all of the text within the image. The NLP system can generate one or more binary masks based on the set of bounding box coordinates and may mask the image with the one or more binary masks. Based on the masked image, the NLP system can utilize a statistical learning regressor to determine if the set of text corresponds to all of the text within the image. For example, the statistical learning regressor may output a particular value (e.g., a 1) if the set of text corresponds to all of the text within a given image. Further, the statistical learning regressor may output a particular value (e.g., a 0) if the set of text does not correspond to all of the text within a given image (e.g., the bounding box coordinates do not identify any bounding boxes for text and the image contains text. The output of the statistical learning regressor may identify a confidence score that the set of text corresponds to a plurality of text of the image.

In order to identify the classifications of the different portions of the set of text, the NLP system, at block 404, identifies one or more embeddings of the set of text and the location information. The NLP system may identify one or more embeddings that includes a textual embedding of the set of text and a positional embedding of the location information. In some embodiments, the textual embedding may be a learned textual embedding and the NLP system may be trained to learn the textual embedding of the set of text. Further, the positional embedding may be a fixed positional embedding based on the image data.

Based on identifying the one or more embeddings of the set of text and the location information, the NLP system, at block 406, projects the one or more embeddings onto a latent space using a cross-attention mechanism to generate transformed latent information. In some embodiments, the latent space may be a learned latent space. For example, the latent space may be an initial (e.g., a base) latent space or a latent space learned over multiple iterations of the multi-stage process of projecting the one or more embeddings onto the latent space and projecting the transformed latent information onto the input sequence space. In order to generate the transformed latent information, the NLP system may generate latent information and process the latent information to identify characteristics of the latent information. Further, the NLP system can generate transformed latent information based on the characteristics.

In order to project the transformed latent information to the input sequence space, the NLP system, at block 408, projects the transformed latent information onto the input sequence space using a reversed cross-attention mechanism to generate processed latent information.

Based on projecting the transformed latent information onto the input sequence space, the NLP system, at block 410, routes the processed latent information to a neural network. The neural network can identify a class prediction for one or more elements of the projected latent information. For example, the neural network can identify a class prediction for a particular text sequence of the set of text.

In some embodiments, projecting, using the cross-attention mechanism, the one or more embeddings onto the latent space and projecting, using the reversed cross-attention mechanism, the transformed latent information onto the input sequence space form an individual stage within a multi-stage process. Additional stages of the multi-stage process include providing output, from a prior layer, from projecting, using the reversed cross-attention mechanism, onto the input sequence space (e.g., the processed latent information) as input, for a subsequent layer, for projecting, using the cross-attention mechanism, onto the latent space. Further, the multi-stage process may include a multi-layer refinement and each layer of the multi-layer refinement may include projecting, using the cross-attention mechanism, the output of a prior layer onto the latent space for further processing and projecting, using the reversed cross-attention mechanism, corresponding latent information onto the input sequence space to generate corresponding processed latent information. The multi-layer refinement may include any number of layers (e.g., m layers, where m can be any number). For example, the NLP system can project, using the cross-attention mechanism, the processed information onto the latent space to generate second projected latent information and the second projected latent information may be transformed to generate second transformed latent information. Further, the NLP system can project, using the reversed cross-attention mechanism, the second transformed latent information onto the input sequence space to generate second processed latent information and route the second processed latent information to the neural network which may output an additional class prediction for the one or more elements of the set of text based on the second processed latent information.

Figure 5:
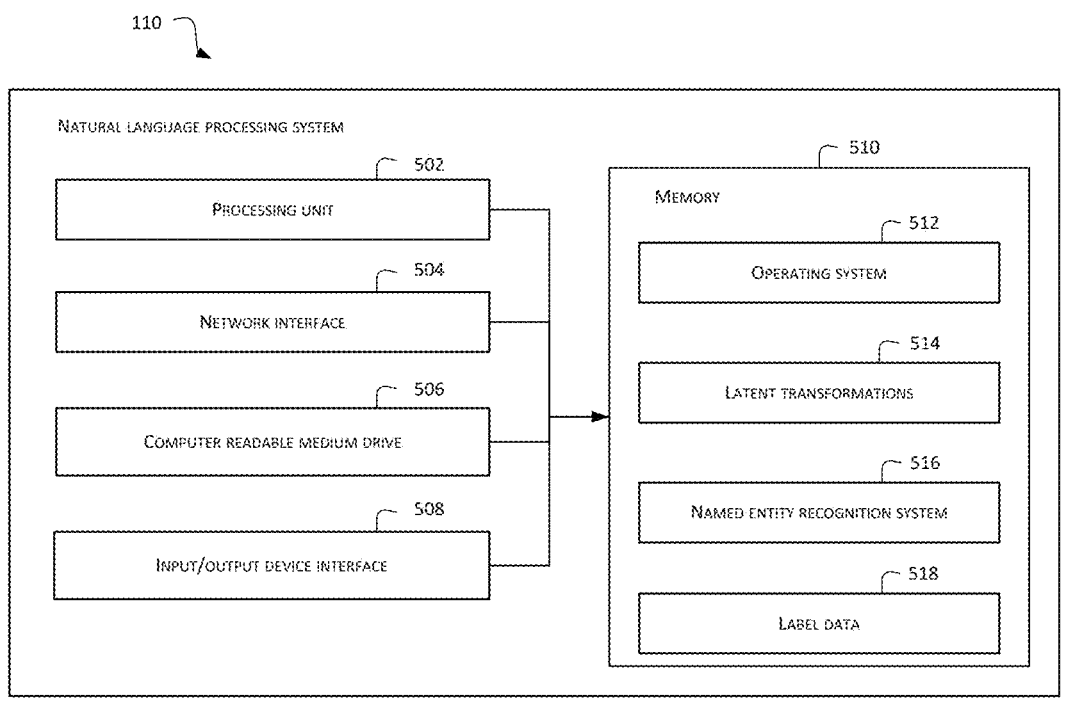
FIG. 5 depicts a general architecture of a computing device providing a natural language processing system that is configured to classify words of a text sequence.

FIG. 5 illustrates an example computing system (e.g., natural language processing system 110) configured to execute the processes and implement the features described above. In some embodiments, the computing system 500 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SDDs"), flash drives, and/or other persistent non-transitory computer-readable media; an input/output device interface 508, such as an IO interface in communication with one or more microphones; and one or more computer readable memories 510, such as random access memory ("RAM") and/or other volatile non-transitory computer-readable media.

The network interface 504 can provide connectivity to one or more networks or computing systems. The computer processor 502 can receive information and instructions from other computing systems or services via the network interface 504. The network interface 504 can also store data directly to the computer-readable memory 510. The computer processor 502 can communicate to and from the computer-readable memory 510, execute instructions and process data in the computer readable memory 510, etc.

The computer readable memory 510 may include computer program instructions that the computer processor 502 executes in order to implement one or more embodiments. The computer readable memory 510 can store an operating system 512 that provides computer program instructions for use by the computer processor 502 in the general administration and operation of the computing system 500. The computer readable memory 510 can further include computer program instructions and other information for implementing aspects of the present disclosure. For example, in one embodiment, the computer readable memory 510 may include latent transformation 514. As another example, the computer-readable memory 510 may include a named entity recognition system 516. Further, the computer readable memory 510 may include label data 518. In some embodiments, multiple computing systems 500 may communicate with each other via their respective network interfaces 504, and can implement speech processing and/or model training separately (e.g., each computing system 500 may execute one or more separate instances of the processes 300 and/or 400), in parallel (e.g., each computing system 500 may execute a portion of a single instance of a process 300 and/or 400), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
 a non-transitory data store configured to store computer-executable instructions; and
 a computing device in communication with the non-transitory data store, wherein the computer-executable instructions, when executed by the computing device, configure the computing device to:
  obtain an image;
  identify a set of text associated with the image and a set of bounding box coordinates associated with the image, wherein the set of text corresponds to an input sequence space, wherein individual bounding box coordinates within the set of bounding box coordinates identify a location of an individual portion of text within the set of text;

identify a textual embedding of the set of text and a positional embedding of the set of bounding box coordinates;

project, using a cross-attention mechanism, the textual embedding of the set of text and the positional embedding of the set of bounding box coordinates onto a learned latent space to generate projected latent information;

process the projected latent information to identify one or more characteristics of the projected latent information;

generate transformed latent information based on the one or more characteristics of the projected latent information;

project, using a reversed cross-attention mechanism, the transformed latent information onto the input sequence space to generate processed latent information; and route, to a neural network, the processed latent information, wherein the neural network identifies a class prediction for one or more elements of the processed latent information.

2. The system of claim 1, wherein, to identify the set of text, the computer-executable instructions, when executed by the computing device, further configure the computing device to:

classify a plurality of text using a neural network layer to identify probabilistic data regarding a classification of one or more words of the plurality of text; and filter the plurality of text based on the probabilistic data to identify the set of text.

3. The system of claim 1, wherein the textual embedding of the set of text comprises a learned textual embedding of the set of text and the positional embedding of the set of bounding box coordinates comprises a fixed positional embedding of the set of bounding box coordinates.

4. The system of claim 1, wherein the computer-executable instructions, when executed by the computing device, further configure the computing device to determine an amount of text of the image associated with the set of bounding box coordinates based on the image.

5. The system of claim 1, wherein, to identify the set of text, the computer-executable instructions, when executed by the computing device, further configure the computing device to:

identify a task associated with the image;

classify a plurality of text using a neural network layer to identify probabilistic data regarding a classification of one or more words of the plurality of text, the probabilistic data identifying a probability of an association with the task for each of the one or more words; and filter the plurality of text based on the probabilistic data to identify the set of text, wherein the set of text is associated with the task.

6. A computer-implemented method comprising:

identifying a set of text associated with an image and a set of bounding box coordinates associated with the image, wherein the set of text corresponds to an input sequence space, wherein individual bounding box coordinates within the set of bounding box coordinates identify a location of an individual portion of text within the set of text;

identifying one or more embeddings of the set of text and the set of bounding box coordinates;

projecting, using a cross-attention mechanism, the one or more embeddings onto a latent space to generate projected latent information, wherein the projected latent information is transformed, via a latent transformer, to generate transformed latent information;

projecting, using a reversed cross-attention mechanism, the transformed latent information onto the input sequence space to generate processed latent information; and routing, to a neural network, the processed latent information, wherein the neural network identifies a class prediction for one or more elements of the set of text based on the processed latent information.

7. The computer-implemented method of claim 6, wherein the processed latent information is first processed latent information, the projected latent information is first projected latent information, and the transformed latent information is first transformed latent information, the method further comprising:

projecting, using the cross-attention mechanism, the first processed latent information onto the latent space to generate second projected latent information, wherein the second projected latent information is transformed, via the latent transformer, to generate second transformed latent information;

projecting, using the reversed cross-attention mechanism, the second transformed latent information onto the input sequence space to generate second processed latent information; and routing, to the neural network, the second processed latent information, wherein the neural network identifies an additional class prediction for the one or more elements of the set of text based on the second processed latent information.

8. The computer-implemented method of claim 6, further comprising processing the projected latent information in the latent space to generate the transformed latent information.

9. The computer-implemented method of claim 6, wherein identifying the set of text comprises extracting nutritional data from the image.

10. The computer-implemented method of claim 6, wherein the neural network is a first neural network, the method further comprising:

classifying a plurality of text using a second neural network to identify probabilistic data regarding a classification of one or more words of the plurality of text; and filtering the plurality of text based on the probabilistic data to identify the set of text.

11. The computer-implemented method of claim 6, further comprising filtering a plurality of text to identify the set of text based on a task to identify nutritional data associated with the image.

12. The computer-implemented method of claim 6, further comprising:

identifying a portion of a plurality of text corresponding to one or more numbers; and filtering the plurality of text to identify the set of text, wherein the set of text comprises the portion of the plurality of text.

13. The computer-implemented method of claim 6, wherein identifying the set of text comprises:

identifying one or more keys associated with a task;

identifying the one or more keys in the image; and identifying one or more key-values associated with the one or more keys in the image, wherein the set of text corresponds to the one or more keys and the one or more key-values.

14. The computer-implemented method of claim 6, wherein the neural network is a first neural network, the method further comprising identifying, using a second neural network, a confidence score based on the set of text and the image, wherein the confidence score identifies a probability that the set of text corresponds to a plurality of text of the image.

15. The computer-implemented method of claim 6, wherein the latent space comprises a base latent space or a prior, learned latent space.

16. The computer-implemented method of claim 6, wherein the set of text is processed via a multi-layer refinement, wherein each layer of the multi-layer refinement comprises:
   projecting, using the cross-attention mechanism, an output of a prior layer onto the latent space for further processing; and
   projecting, using the reversed cross-attention mechanism, corresponding projected latent information onto the input sequence space to generate corresponding processed latent information.

17. The computer-implemented method of claim 6, wherein the set of text is processed via a multi-layer refinement, wherein the multi-layer refinement comprises m layers.

18. The computer-implemented method of claim 6, wherein the one or more embeddings comprise a textual embedding of the set of text and a positional embedding of the set of bounding box coordinates.

19. Non-transitory computer-readable media including computer-executable instructions that, when executed by a processor, cause the processor to:
   identify a set of text and location information for the set of text, wherein the set of text corresponds to an input sequence space;
   identify one or more embeddings of the set of text and the location information;
   project, using a cross-attention mechanism, the one or more embeddings onto a latent space to generate projected latent information, wherein the projected latent information is transformed, via a latent transformer, to generate transformed latent information;
   project, using a reversed cross-attention mechanism, the transformed latent information onto the input sequence space to generate processed latent information;
   wherein projecting, using the cross-attention mechanism, the one or more embeddings onto the latent space and projecting, using the reversed cross-attention mechanism, the transformed latent information onto the input sequence space form an individual stage within a multi-stage process, and wherein additional stages of the multi-stage process comprise providing output from a prior projecting, using the reversed cross-attention mechanism, onto the input sequence space as input for a subsequent projecting, using the cross-attention mechanism, onto the latent space; and
   route, to a neural network, the processed latent information, wherein the neural network identifies a class prediction for one or more elements of the set of text based on the processed latent information.

20. The non-transitory computer-readable media of claim 19, wherein the computer-executable instructions, when executed by the processor, further cause the processor to process the projected latent information in the latent space to generate the transformed latent information.

* * * * *